No. 640,520. Patented Jan. 2, 1900.
J. BAILEY.
RAISING GIG FOR WOOLEN FABRICS.
(Application filed Nov. 5, 1896.)

(No Model.) 6 Sheets—Sheet 1.

Witnesses.

Inventor
John Bailey
by
Leonard H. Hunton Atty
Atty.

No. 640,520.  
J. BAILEY.  
RAISING GIG FOR WOOLEN FABRICS.  
(Application filed Nov. 5, 1896.)  
Patented Jan. 2, 1900.  
(No Model.)  
6 Sheets—Sheet 2.
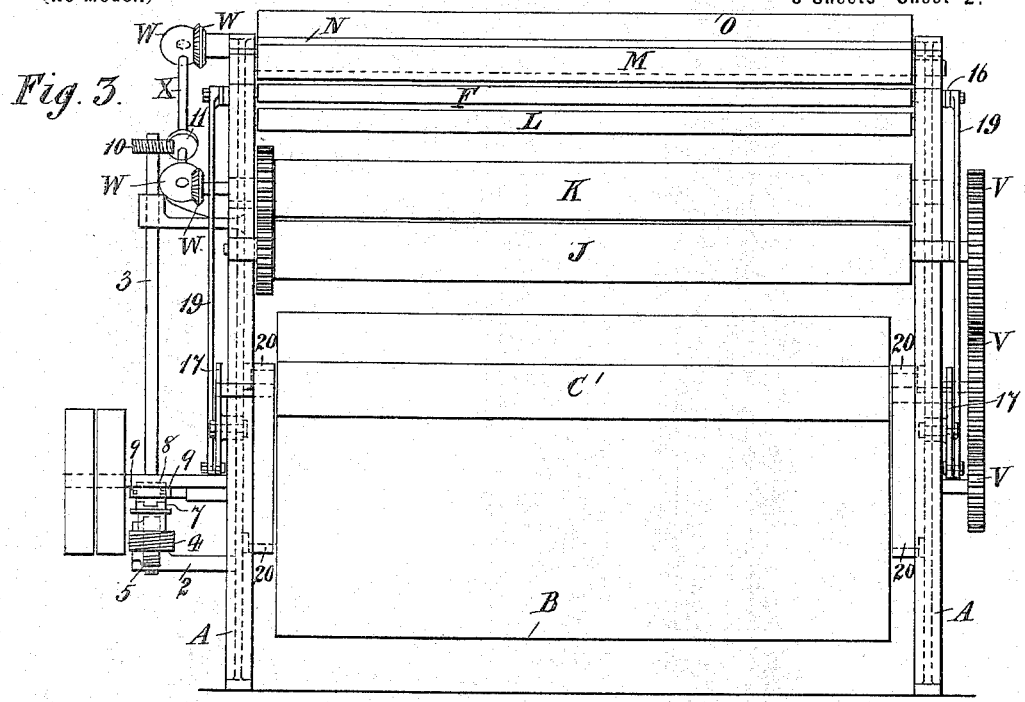
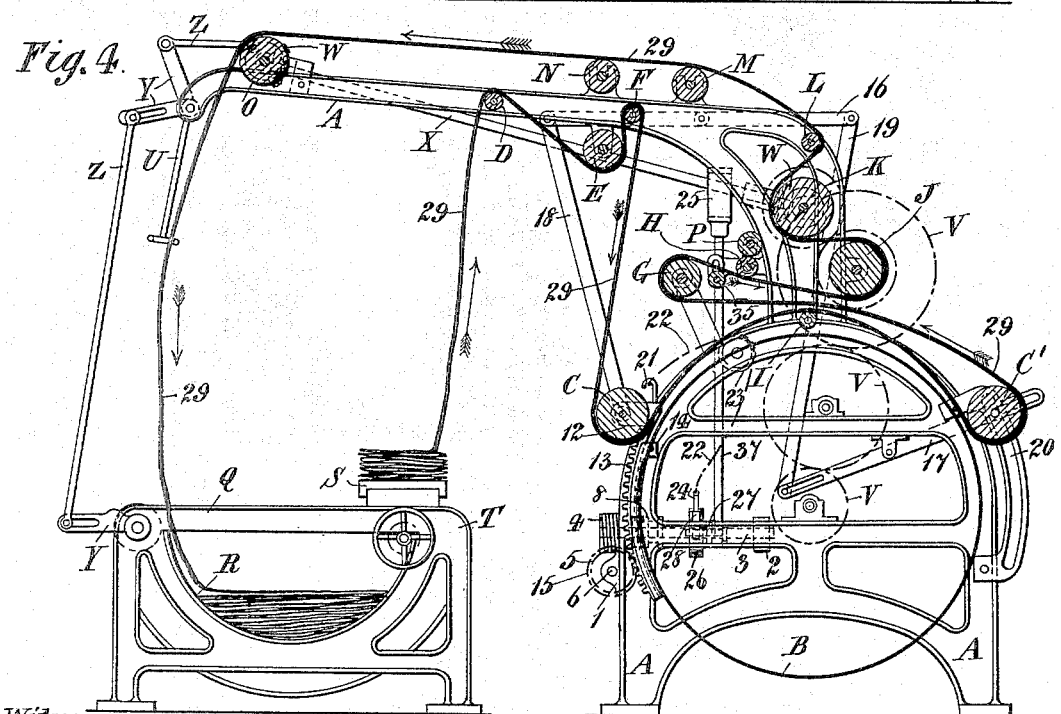
Witnesses.
Inventor  
John Bailey

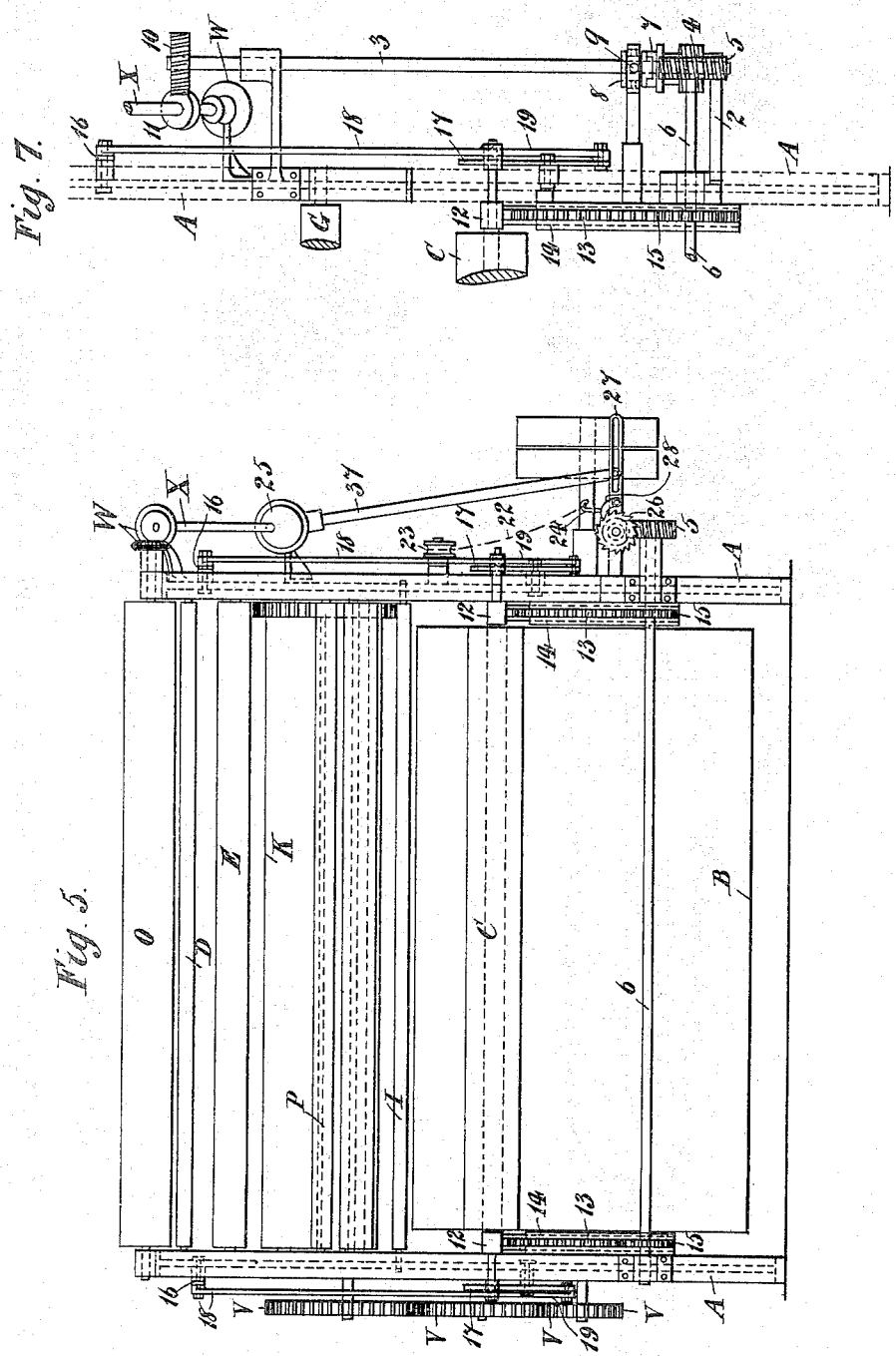

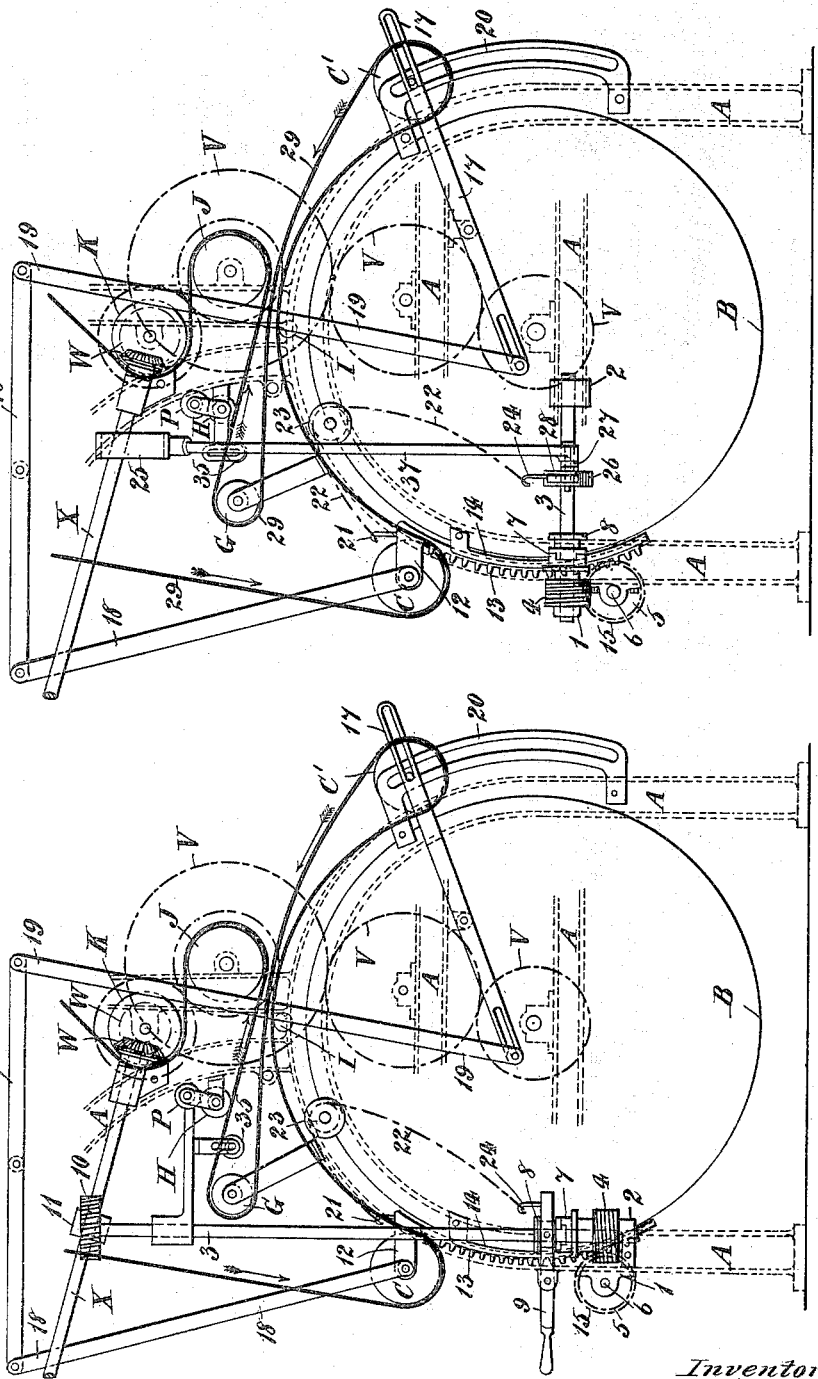

No. 640,520. Patented Jan. 2, 1900.
J. BAILEY.
RAISING GIG FOR WOOLEN FABRICS.
(Application filed Nov. 5, 1896.)
(No Model.) 6 Sheets—Sheet 5.
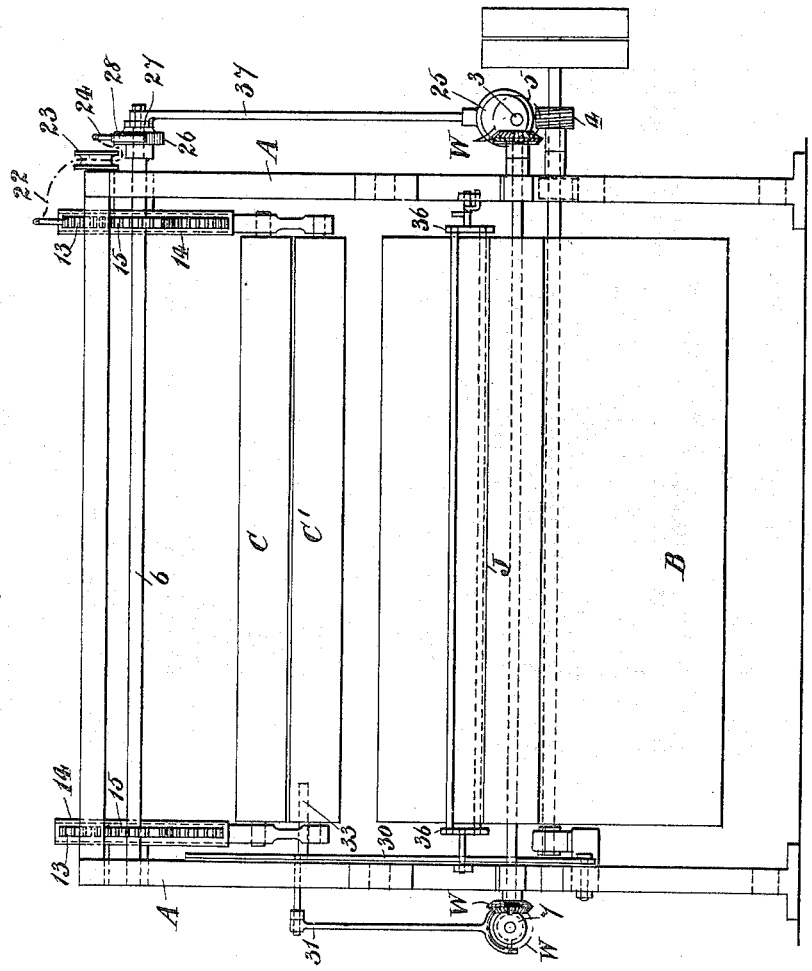
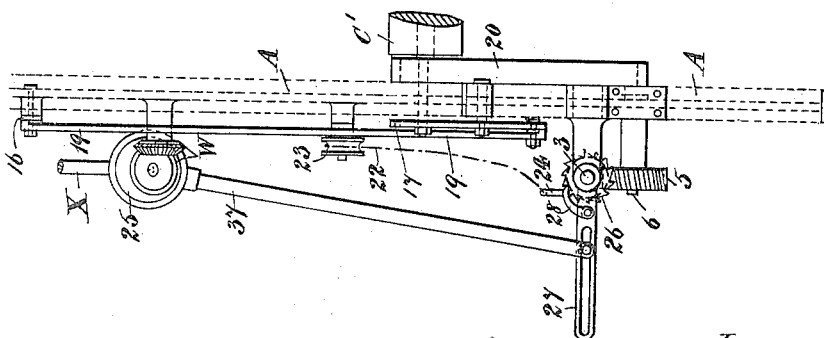
Witnesses
Inventor
John Bailey No. 640,520. Patented Jan. 2, 1900.
J. BAILEY.
RAISING GIG FOR WOOLEN FABRICS.
(Application filed Nov. 5, 1896.)
(No Model.) 6 Sheets—Sheet 6.
Fig. 11.
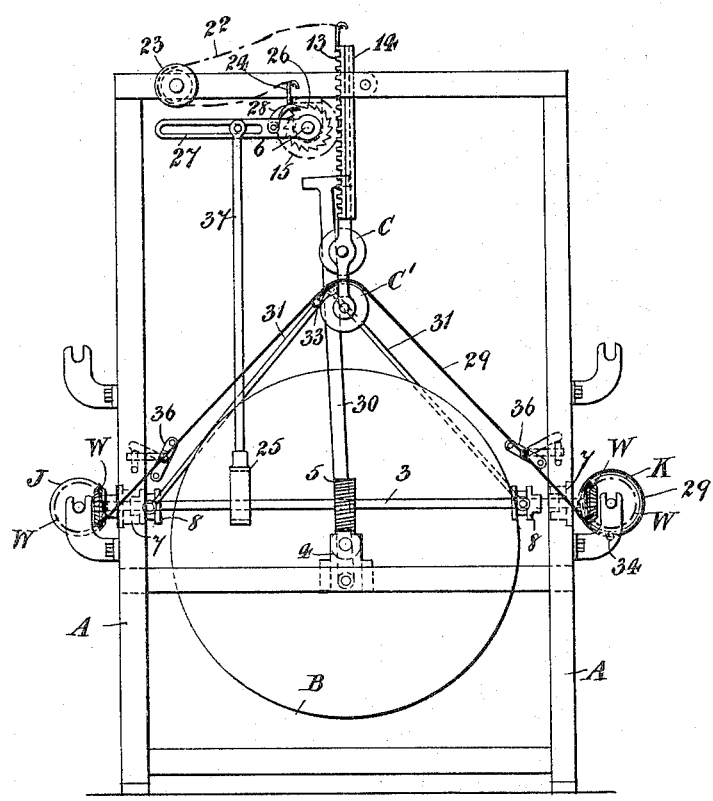
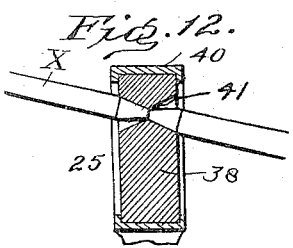
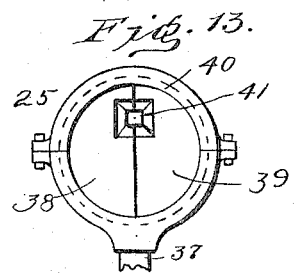
Fig. 12.
Fig. 13.
Witnesses
L. Della McGirr
Richie G. Reese
Inventor
John Bailey
by Leonard Hunton
Att'y.

UNITED STATES PATENT OFFICE.

JOHN BAILEY, OF DEWSBURY, ENGLAND.

RAISING-GIG FOR WOOLEN FABRICS.

SPECIFICATION forming part of Letters Patent No. 640,520, dated January 2, 1900.

Application filed November 5, 1896. Serial No. 611,130. (No model.)

*To all whom it may concern:*

Be it known that I, JOHN BAILEY, a subject of the Queen of Great Britain, residing at Myrlin House, Staincliffe road, Dewsbury, in the county of York, England, have invented new and useful Improvements in or Relating to Raising-Gigs Employed in the Manufacture of Woolen and other Woven or Felted Fabrics, (for which a patent has been granted in Great Britain, No. 11,925, dated June 2, 1896,) of which the following is a specification.

This invention relates to improvements in raising-gigs such as are employed in the woolen trade; and its object is to automatically work a single or double breast-roller down onto the teazles or cards of a teazle or other kind of raising-gig which are used for raising a nap or pile on blankets, cloth, or other woven or felted fabrics or materials and which breast-rollers have hitherto been worked down by hand.

Figure 1:
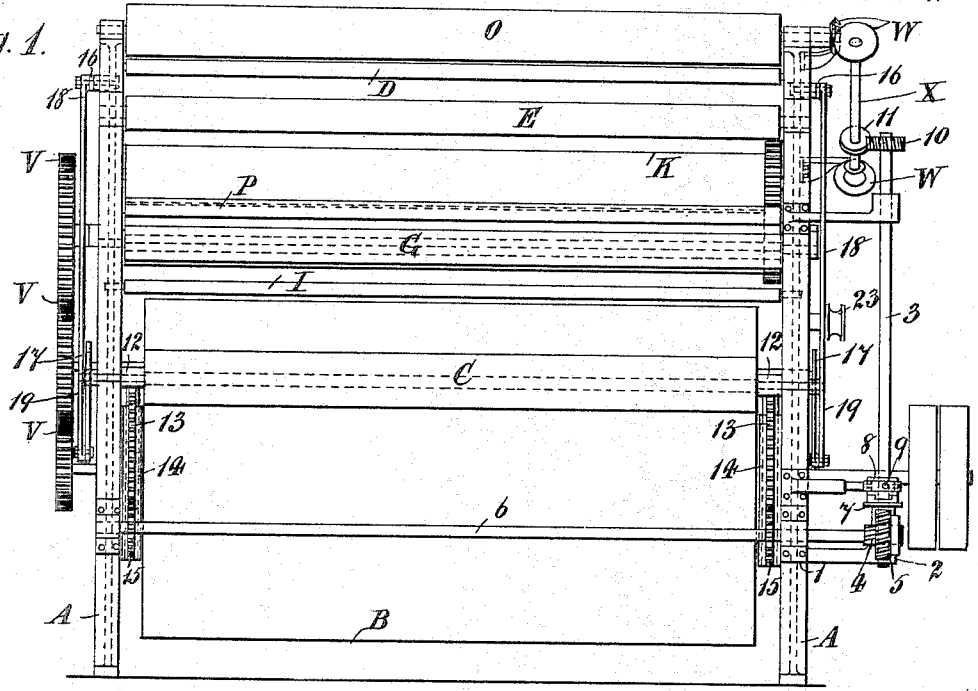
Figure 2:
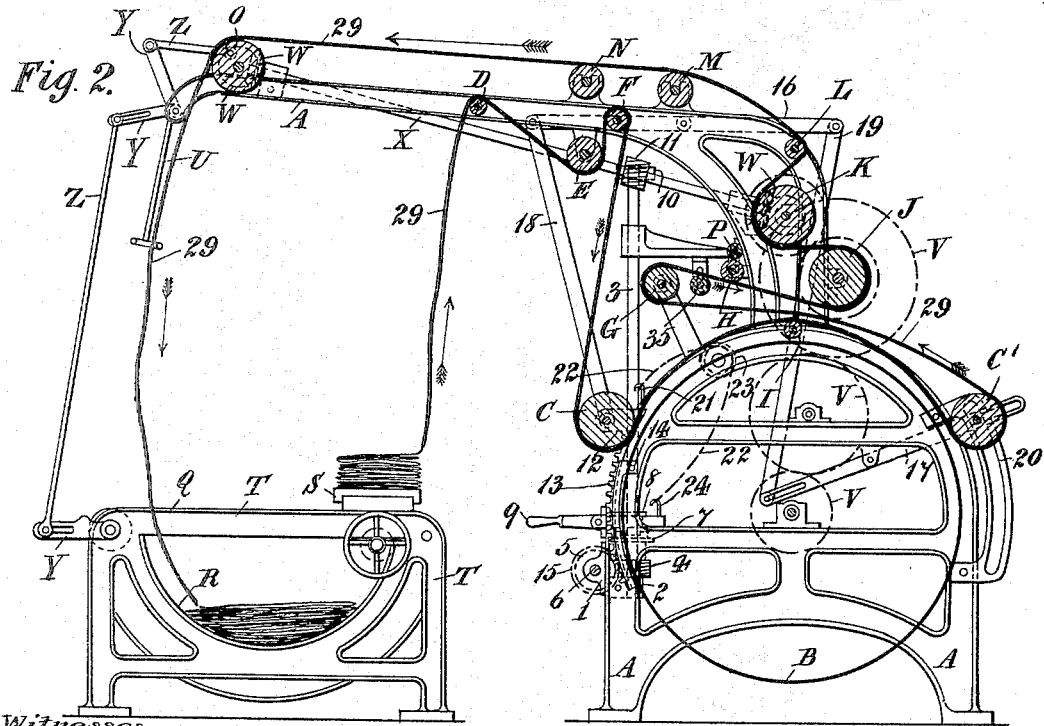

In the drawings hereunto annexed, Figure 1 is a front elevation, Fig. 2 a side elevation, and Fig. 3 a back elevation, of a raising-gig constructed according to the British pattern having two breast-rollers and with my invention applied, but operated by a worm and worm-wheel. Fig. 4 is a side elevation, and Fig. 5 a front elevation, of a raising-gig having two breast-rollers and with my invention applied thereto, but operated by an eccentric. Fig. 6 is an enlarged part side elevation, Fig. 7 an enlarged part front elevation, Fig. 8 an enlarged part side elevation, and Fig. 9 an enlarged part back elevation, of my improvements. Fig. 10 is a front elevation, and Fig. 11 a side elevation, of a raising-gig constructed according to the American pattern having two breast-rollers and with my invention applied thereto. Fig. 12 is a side view, partially in section, and Fig. 13 an end view, of the eccentric 25.

Like parts in all the views are marked with similar letters and figures of reference.

A is the framework of the gig, B the cylinder in which the teazles are fixed, or its periphery may be clothed with carding. The cylinder is mounted in bearings and motion conveyed thereto in the usual manner.

C is the front breast-roller, and C' the back breast-roller.

D, E, F, G, H, I, J, K, L, M, N, and O are bars and rollers, over, under, or around which the material operated upon passes to and from the cylinder B.

Roller H is clothed with carding, and over or above it is mounted in suitable bearings a circular revolving adjustable (or otherwise) brush P for cleaning roller H, the rollers J and K being employed for drawing purposes.

Q is the scray, provided with a semicircular endless traveling sheet R and having a traveling table S mounted upon its framework T.

U is the cuttling arrangement.

All the above-named parts and other portions not shown or described of the raising-gig and scray may be of ordinary well-known construction, and motion is conveyed thereto in the usual manner by means of spur-gearing V, bevel-gearing W, mounted on shaft X, and levers Y and rods Z, or by pulleys and belting.

To the framework A is fixed by any suitable means the bearings 1 and 2, in which is mounted the shaft 3, which at Figs. 1, 2, 3, 6, and 7 is shown in a vertical position, but at Figs. 4, 5, 8, and 9 in a horizontal position. At Figs. 1, 2, 3, 6, and 7 on the shaft 3 is mounted a worm 4, which gears with a worm-wheel 5, mounted on the pinion-shaft 6, to be hereinafter described. On the shaft 3 is also mounted a clutch, the female part 7 of which is mounted loosely thereon, while its male portion 8 is arranged to slide upon a key fixed in the periphery of the said shaft and to mesh with the female portion whenever it is desired to operate the breast roller or rollers. The male portion 8 of the clutch is operated by a lever 9, (having a handle at one end and bifurcated, if desired, but not necessarily so, at the other end for passing into a groove formed for its reception in the male portion of the clutch,) pivoted to the framework A. At the upper end of the shaft 3 is also mounted and fixed a worm-wheel 10, gearing into a worm 11, mounted and fixed to the shaft X, by which a rotary motion is imparted to the shaft 3.

The front breast-roller C is mounted in suitable bearings 12, which are fixed to or form a portion of the upper end of the racks 13, which are carried in suitable bearings or slides 14, formed on or attached to the framework A at each end of the cylinder B. The two pinions 15, mounted upon the shaft 6, are arranged to gear with the racks 13—that is, one pinion into each of the racks. To the framework A are also pivoted the levers 16 and 17—that is to say, there are two levers 16 and two levers 17 arranged on opposite sides of the gig. The upper ends of racks 13 are connected to the front ends of the levers 16 by rods 18, through which the spindle or shaft of the front breast-roller C may pass, while the heel or rear ends of levers 16 are connected to the front ends of levers 17 by rods 19, which work within slots in the extremity of the lever 17. The rear ends of the levers 17 are slotted to receive the spindle or shaft of back breast-roller C', which also passes into the slotted guides 20, fixed to the framework A at both ends of the cylinder B. By means of the pivoted levers and their connecting-rods both breast-rollers are actuated simultaneously.

To the top of the racks 13 is fixed a hook 21, to one end of which a chain 22 is fixed and which is arranged to pass over a pulley 23 (mounted on a stud fixed to the framework A) in order that its opposite end may be adjustably attached to the hook 24, fixed to the rear end of the handled lever 9. When the racks 13 are at their highest position, the chain 22 is slack, as shown.

A roller 35, which may be so mounted as to be adjustable with the frame, is provided between roller G and card-roller H and arranged to pass under the piece or fabric 29 before it is acted by card-roller H. When the roller 35 is raised, it will cause the fabric to have a greater pressure on the periphery of the card-roller H than when in a lower position—that is, nearer to roller G.

The operation of the machine is as follows: The material to be operated upon, which in the drawings is represented by thick dotted lines numbered 29, is placed upon the traveling table S of the scray Q and carried up to and over bar D, under roller E, over bar F, down to, under, and around front breast-roller C, over roller I, to, under, and around back breast-roller C', and from thence back to the roller G, under carded roller H, (when it is required to raise the back of the fabric,) to, around, and between the drawing-rollers J and K, then to roller L, and over rollers M, N, and O to the cuttling apparatus, by which it is laid in folds in the receptacle R; but when the rollers G and H are dispensed with then the fabric passes direct from back breast-roller C' to the drawing-rollers J and K. After a sufficient length of the material 29 has been drawn from the table S to permit of it being passed under the breast-rollers C C' to the drawing-rollers J and K and other rollers to the cuttling-lever U in the usual manner the gig is set in motion. The male portion 8 of the clutch having been meshed with its female portion 7, a rotary motion is transmitted from shaft X through worm-wheel 10, worm 11, shaft 3, worm 4, worm-wheel 5 to shaft 6 and pinions 15, which causes the racks 13 to be gradually and automatically moved downward until the material 29 has been traversed onto the teazles sufficiently low as required. When this has been accomplished, the chain 22 will have become sufficiently taut to raise the rear end of handled lever 9 and throw the two portions 7 and 8 of the clutch out of gear with each other, thereby preventing the racks 13 from being traversed too far down. The material 29 as it passes over the raising-cylinder B from front breast-roller C to back breast-roller C' comes twice during its passage from the scray back to the same under the action of the teazles instead of once, as on raising-gigs of ordinary construction, thus enabling the work to be performed in about one-half the time as at present—that is to say, a piece, say, one hundred yards long can by my improved apparatus be raised in about the same time as it now takes to raise a piece, say, fifty yards in length by a gig of ordinary construction. When the raising of the piece has been completed, the racks 13 may be returned to their normal or highest position by hand or by power, in either case by reversing the rotation of the pinions 15 and shaft 6.

At Figs. 4, 5, 8, and 9, where the shaft 3 is shown in a horizontal position, the worm-wheel 10 and worm 11 are dispensed with, and in place thereof I employ an eccentric 25, which is mounted and fixed upon shaft X, and on shaft 3 is fixed a ratchet-wheel 26 and loosely mounted a slotted lever 27, armed with a pawl 28, which engages with the said ratchet-wheel. A rod 37, one end of which is capable of adjustment in the slotted lever 27, while its opposite end is armed with the straps of the eccentric, is employed for transmitting the motion from the eccentric 25, which is mounted on the shaft X by means of a knuckle-bearing, to the shaft through the slotted lever 27, pawl 28, and ratchet-wheel 26. As shown in Figs. 12 and 13, the shaft X has a reduced squared portion 41 adjacent to the central line of the eccentric 25. The two halves 38 and 39 of the latter fit over the shaft adjacent to said reduced portion and are permanently secured in place by means of the strap 40, to which the eccentric-rod 37 is secured. The strap 40 is kept in position by means of the flanges formed thereon. In this case the use of the clutch and handled lever 9 is optional, (but I prefer using them,) and the hook 24 and one end of chain 22 are fixed to the pawl 28 instead of to the end of the rear end of the handled lever 9. In other respects the arrangement and operation of the various parts are the same as described for Figs. 1 to 3; but when the drawing-rollers J and K, on which the material is wound, alternately, are mounted at opposite ends of the machine and provided with bevel-gearing W, an American pattern of raising-gig, as shown at Figs. 10 and 11, a shaft 3, driven by a worm 4, and worm-wheel 5, mounted, say, horizontally or in an angular direction, is provided with two clutches—that is to say, there are two female portions 7, mounted loosely on the shaft and facing each other, and two male portions 8, arranged to slide on keys provided on the shaft and to mesh with one of the female portions 7 at a time, or when in their normal position to be clear of both of them. A reversing-lever 30 is pivoted to the framework A, and to this lever are jointed the rods 31, which take the place of handled lever 9 and are employed for moving the male portions 8 of the clutches into and out of gear with the female portions 7. The reversing-lever 30 is automatically operated by the piece or canvas 32, which reciprocates backward and forward between the two drawing-rollers. The piece or canvas 32 is provided with two knocking-pieces 33 and 34, arranged at a suitable distance apart. Whenever one of these knocking-pieces comes in contact with the reversing-lever 30, it carries it over to the opposite side of the machine, and by withdrawing the male portion 8 from one female portion 7 and meshing it with the other female portion the winding action of the drawing-rollers is reversed. By moving the lever 30 toward one or the other of the drawing-rollers J or K it will be set in motion by the meshing of its clutch for winding on the material while the opposite roller is unwinding. The racks 13, slides 14, pinions 15, and shaft 6 are in this arrangement of gig mounted above the raising-cylinder B, preferably vertically, and the pinions 15 and shaft 6 may be actuated for automatically and gradually lowering the material 29 onto the teazles of the raising-cylinder by an eccentric 25, mounted on shaft 3, ratchet-wheel 26, mounted and fixed on shaft 6, slotted lever 27, (provided with a pawl 28 for engaging with said ratchet-wheel,) mounted loosely on shaft 6, and a connecting-rod 37. A pivoted double bar 36 is carried in suitable bearings from framework A and is employed for tightening the material 29, so as to keep it clear of cylinder B when the front roller is in its raised position. Any suitable catch arrangement may be employed for retaining the pivoted bar in a fixed position.

The action of the above-named parts, as well as those not described, but shown and lettered, is the same as already described, and the material as it passes from roller J to roller K, or vice versa, may be arranged to be submitted twice to the action of the teazles of the raising-cylinder.

By the herein-described means the breast roller or rollers may be worked gradually and automatically downward onto the teazles instead of being done so by hand, thus enabling the work to be performed uniformly and regularly, filling in the bottom of the cloth better and raising less of it away. Further, there is a saving of teazles, and the machine can easily be made to run faster or slower, according to the material operated upon. The operation is also much quicker performed, as the breast roller or rollers is or are continually working down and are not so liable to make thin places. Also in no case can the said roller or rollers be allowed to stand too long and then worked down too much at a time, as is frequently the case when operated by hand.

Having now described the nature of my invention, what I claim, and desire to secure by Letters Patent, is—

1. In a gig for raising the nap or pile of woolen or other woven or felted fabrics, the combination with a revolving raising-cylinder, means for revolving the same, the drawing-rolls, and a breast-roller, connections between said raising-cylinder and breast-roller substantially as herein described for first gradually and automatically working down the said breast-roller onto the said raising-cylinder, then arresting such downward motion of the breast-roller, and finally submitting the material operated upon to the action of said raising-cylinder at a portion of its periphery, substantially as described.

2. In a gig for raising the nap or pile of woolen or other woven or felted fabrics, the combination with a revolving raising-cylinder, means for revolving the same, the breast-roller mounted in bearings arranged to move concentrically with relation to the periphery of said cylinder, means operated by the moving part of the gig for moving said breast-roller down the face of the cylinder, a second roller mounted on the opposite side of said cylinder, and connections between said rollers whereby they will move simultaneously downward, substantially as described.

3. In a gig for raising the nap or pile of woolen or other woven or felted fabrics, the combination with a raising-cylinder, tracks in front of the raising-cylinder, a breast-roller mounted in said tracks, means for automatically moving said breast-roller concentric with relation to the periphery of said cylinder, said means consisting of the eccentric 25 mounted on the moving shaft X, the connecting-rod 37, the slotted lever 27 on the shaft 3, a clutch on said shaft, a worm on said shaft, a gear 5 engaging therewith, means driven by said gear 5 for moving the roller downwardly in relation to the face of the raising-cylinder, and a chain connecting said breast-roller and pawl so that when the said roller reaches its lowermost position the said pawl will be thrown out of gear with the ratchet-wheel, substantially as described.

4. In a gig for raising the nap or pile of woolen or other woven or felted fabrics, the combination with a raising-cylinder, a breast-roller mounted in tracks in front of the raising-cylinder, means for automatically moving said breast-roller concentrically in relation to the face of said raising-cylinder, said means consisting of the eccentric 25 mounted on the moving shaft X, the connecting-rod 37, the slotted lever 27 on the shaft 3, a clutch on said shaft, a worm on said shaft, a gear 5 engaging therewith, means driven by said gear 5 for moving the roller downwardly in relation to the face of the raising-cylinder, a chain, pulley and hooks for throwing said pawl out of gear with the ratchet-wheel, and a breast-roller working on the opposite face of the said cylinder and connected by means of levers and a connecting-rod to the breast-roller, whereby they will both be moved simultaneously downward, substantially as described.

5. In a gig for raising the nap or pile of woolen or other woven or felted fabrics, the combination with the raising-cylinder, racks in front of the said raising-cylinder, a breast-roller mounted in said racks, slotted guides at the back of said raising-cylinder, a second breast-roller mounted within said guides, and pivoted levers attached to said slotted guides and connected by rods to said racks, substantially as set forth.

In testimony whereof I have hereunto signed my name to this specification in presence of two subscribing witnesses.

JOHN BAILEY.

Witnesses:
WILLIAM SADLER,
ADAM C. HART.